United States Patent [19]

Vanderpool

[11] Patent Number: 4,540,822

[45] Date of Patent: Sep. 10, 1985

[54] REGENERATIVE PROCESS FOR THE PREPARATION OF LINEAR POLYETHYLENEPOLYAMINES USING A SUPPORTED CATALYST

[75] Inventor: Steven H. Vanderpool, New Braunfels, Tex.

[73] Assignee: Texaco, Inc., White Plains, N.Y.

[21] Appl. No.: 553,333

[22] Filed: Nov. 22, 1983

Related U.S. Application Data

[63] Continuation-in-part of Ser. No. 455,160, Jan. 3, 1983.

[51] Int. Cl.$^3$ .............................................. C07C 85/06
[52] U.S. Cl. ..................................... 564/479; 564/512
[58] Field of Search ............... 564/479, 485, 509, 512; 260/687 R; 502/52, 38, 49

[56] References Cited

U.S. PATENT DOCUMENTS

| | | | |
|---|---|---|---|
| 2,226,548 | 12/1940 | Burk ........................................ | 502/49 |
| 2,824,073 | 2/1958 | Rylander et al. .................... | 252/437 |
| 2,921,081 | 1/1960 | Zimmerschied et al. ........... | 252/437 |
| 4,036,881 | 7/1977 | Brennan et al. ..................... | 564/479 |

*Primary Examiner*—Charles F. Warren
*Assistant Examiner*—John A. Sopp
*Attorney, Agent, or Firm*—Jack H. Park; Kenneth R. Priem

[57] ABSTRACT

This invention is directed to a regenerative process for preparing predominantly linear polyethylenepolyamines from ethylenediamine and monoethanolamine using a catalyst comprising a phosphorous compound deposited on a group IVb transition metal oxide support.

11 Claims, No Drawings

REGENERATIVE PROCESS FOR THE PREPARATION OF LINEAR POLYETHYLENEPOLYAMINES USING A SUPPORTED CATALYST

This invention is a continuation-in-part of copending application Ser. No. 455,160, filed Jan. 3, 1983, and entitled "Catalysts and Preparation of Linear polyethylenepolyamines Therewith".

BACKGROUND OF THE INVENTION

1. Technical Field of the Invention

This invention relates to a continuous process for the preparation of predominantly linear polyethylenepolyamines from ethylenediamine and monoethanolamine in the presence of unique thermally pelleted activated catalyst compositions having phosphorous deposited on a group IVb transition metal oxide and to the use of oxygen to regenerate the catalyst when it has become at least partially deactivated during the course of the reaction.

2. Prior Art

Heretofore, polyethylenepolyamine compounds such as diethylenetriamine, triethylenetetramine and the higher homologs have been produced by the reaction of an alkyl halide such as ethylene dichloride with an amine such as ammonia or ethylenediamine at elevated temperatures and pressures. Normally, relatively high yields of predominantly non-cyclic polyethylenepolyamine compounds are obtained from this process with varying yields of heterocyclic amines. The large amounts of energy required to produce the reactants as well as the difficult separation procedures required to recover the more valuable linear polyethylenepolyamines diminish the usefulness of the ethylene dichloride process. The hydrohalide salts of ammonia and the polyethylenepolyamine products must also undergo difficult and time consuming caustic neutralization to yield the free polyethylenepolyamines.

It has heretofore been known that phosphates can be used to catalyze reactions to produce predominantly heterocyclic rather than linear products. Thus, U.S. Pat. No. 3,297,701 teaches the use of aluminum phosphate to catalyze the reaction of ethanolamines and polyethylenepolyamines to yield cyclic compounds. U.S. Pat. No. 3,342,820 discloses the use of aluminum phosphate for the preparation of heterocyclic compounds such as triethylenediamine. As another example, U.S. Pat. No. 4,103,087 also discloses the use of aluminum phosphate catalysts for producig heterocyclic product compounds.

More recently, investigators have found that more linear products can also be obtained in a catalyst conversion. Thus, Ford et al. U.S. Pat. No. 4,316,840 discloses the preparation of polyalkylenepolyamines from ethylene diamine utilizing a metal nitrate or sulfate as a catalyst. U.S. Pat. No. 4,314,083 discloses the reaction of ethylene diamine with monoethanolamine to prepare noncyclic polyalkylenepolyamines using, as a catalyst, a salt of a nitrogen or sulfur-containing compound.

In inventions originating in our laboratories, Brennan et al. in U.S. Pat. No. 4,036,881 discloses the use of phosphorous-containing catalysts to catalyze the reaction of ethylenediamine with monoethanolamine. Excellent results were obtained when the reaction was conducted in an autoclave. However, when the phosphorus compound was supported on silica or diatomaceous earth, good results were obtained only at comparatively low conversions. Brennan et al. U.S. Pat. No. 4,044,053 is also relevant in this regard. Copending application Ser. No. 453,841 of Brennan filed Dec. 27, 1982 now abandoned is directed to an alumina phosphate-type catalyst composition wherein the novel feature is the method of preparing a catalyst from alumina phosphoric acid, ammonium hydroxide and water. Excellent results were obtained using a catalyst of this nature in batch-type reactions. Brennan U.S. Pat. No. 4,103,087 discloses the use of pelleted aluminum phosphate to prepare a di-(N,N-disubstituted amino)alkanes.

French Pat. No. 1,317,359 dated Feb. 8, 1963, discloses the preparation of granulated zirconium phosphate and its use as an ion-exchange resin. Winkler et al. in a 1966 publication [Deutsche Akad. Wiss., Berlin, Germany, Z. Anorg. Allgen. Chem. 346 (1-2), 92–112 (1966)] disclose compounds of the general formula $HX^vP_2O_3$ wherein X represents arsenic, antimony and mixtures thereof. Also disclosed are compounds of the general formula $H_2X^{iv}P_2O_3$, wherein X represents silicon, germanium, tin, lead, titanium and zirconium. It is shown that the group IV phosphates have cation exchange properties.

Daniel Br. Apcn. 2,092,467 published Aug. 18, 1982, modifies iron phosphate catalysts disclosed in Cavaterra U.S. Pat. No. 3,948,595 for making methacrylic acid from isobutyric acid. Daniel uses usch catalysts in admixture with a support prepared by calcining the dried powder recovered from a slurry of silica with phosphoric acid. Daniel teaches that the support is inert and that titania or zirconia can also be used.

Tawil et. al. U.S. Pat. No. 4,025,608 is directed to the reaction of a zirconium salt with phosphoric acid or a phosphate to prepare granular zirconium phosphate for use as an ion exchanger. Zimmerschied et. al. U.S. Pat. No. 2,921,081 discloses catalysts for use in the conversion of olefins that are prepared by reacting a zirconium halide with a designated class of phosphoric acids. Bates U.S. Pat. No. 2,349,243 shows treatment of hydrocarbons with a zirconium phosphate prepared by reacting a phosphoric acid with a soluble salt of zirconium such as the nitrate, sulfate, chloride or oxychloride. Stynes et. al. in U.S. Pat. No. 3,416,884 prepare crystalline zirconium phosphates by thermally treating zirconium phosphate with phosphoric acid to provide products that are useful as ion exchangers and catalysts. Dwyer et. al. U.S. Pat. No. 3,130,147 is concerned with cracking hydrocarbons using an acidic catalyst comprising oxides of aluminum, zirconium and phosphorous prepared by reacting water soluble salts of aluminum and zirconium with certain oxyacids of phosphorous and the salts thereof.

Inoue et. al. U.S. Pat. No. 4,018,706 is directed to the purification of exhaust gases using a support containing an oxide complex of titanium, phosphorous and aluminum. The complex is prepared by mixing a water soluble titanium compound such as titanium tetrachloride or titanium sulfate with a water soluble phosphorous compound such as phosphoric acid. In Holm U.S. Pat. No. 3,448,164 catalysts are disclosed that can contain titania and can be prepared, for example, by coprecipitating titanium metallates or a titanium oxide with aluminum phosphate. Rylander et. al. U.S. Pat. No. 2,824,073 is concerned with the manufacture of a titanium-phosphoric acid catalyst that can be prepared by mixing titania with triphosphoric acid to form a doughy mixture which is thereafter dried and heated.

RELATED COPENDING APPLICATIONS

This invention is a continuation-in-part of copending application Ser. No. 455,160 filed Jan. 3, 1983 and entitled "Catalysts and Preparation of Linear Polyethylenepolyamines Therewith".

This specification includes data related to the invention disclosed and claimed herein and also, for comparative purposes, data is disclosed herein that is also disclosed and claimed in copending U.S. patent applications, as follows:

| Application Serial No. | Filing Date | Inventors | Docket No. | Title |
|---|---|---|---|---|
| 455,158 | 1/3/83 | Vanderpool & Watts | 80,067 | Calcined Catalyst and Preparation of Linear Polyethylenepolyamines Therewith |
| 455,159 | 1/3/83 | Vanderpool & Larkin | 80,068 | Linear Polyethylenepolyamine Preparation and Catalyst |
| 455,156 | 1/3/83 | Vanderpool & Renken | 80,069 | Modified Catalysts and Preparation of Polyethylenepolyamines Therewith |
| 455,155 | 1/3/83 | Vanderpool & Watts | 80,142 | Preparation of Linear Polyamines from Novel Catalysts |
| 455,153 | 1/3/83 | Renken | 80,158 | Supported Catalysts and Preparation of Linear Polyethylenepolyamines Therewith |

SUMMARY OF THE INVENTION

A method of preparing novel catalyst compositions is disclosed. The catalyst is extremely useful in the improved production of predominantly linear polyethylenepolyamines from ethylenediamine and monoethanolamine. The novel phosphate catalysts of the claimed invention can be prepared by treating a group IVb metal oxide support with a phosphorous compound such that, in a thermally activated condition, the phosphorous is chemically bound to the support. These novel compositions can be used to catalyze the reaction of monoethanolamine with ethylenediamine to provide essentially linear polyethylenepolyamine reaction products. It has also been discovered that the novel catalyst compositions when at least partially deactivated in the continuous production of linear polyethylenepolyamine reaction products from monoethanolamine and ethylenediamine can be regenerated by treatment with oxygen under controlled regeneration conditions.

DETAILED DESCRIPTION

In one aspect the invention is directed to improved catalyst compositions comprising a group IVb metal oxide to which phosphorous has been chemically bonded by thermal activation. In another aspect the catalysts are used in producing essentially linear polyethylenepolyamines such as diethylenetriamine, triethylenetetramine, tetraethylenepentamine and pentaethylenehexamine from the reaction of ethylenediamine and monoethanolamine. The inventor is unaware of the precise structural differences between the claimed catalysts and previous phosphate catalysts that have been tried in such reactions, but is cognizant of substantially higher rates of conversion to linear polyethylenepolyamines with the claimed catalysts.

The novel catalyst compositions catalyze the reaction of ethylenediamine with monoethanolamine at a temperature of from about 250° C. to about 400° C., preferably from about 300° C. to about 350° C. and a pressure of from about 500 to about 3000 psig. and preferably from about 1000 to about 2000 psig. Higher temperatures and pressures can be used, if desired, but there is no particular advantage in using such higher temperatures and/or pressures.

The pelleted catalyst compositions of the present invention are normally employed as a fixed bed of catalyst in a continuous reaction system. In a continuous process of this nature, the time of contact of the reactants with the catalysts is one of the interrelated factors that those skilled in the art will adjust, along with temperature, pressure, bed geometry, pellet size, etc. in order to obtain a desired rate of reaction and, hence, a desired percentage of conversion of the reactants. Thus, in a continuous process, it is not necessary to drive the reaction to completion because unreacted feedstock components can be recycled to the reactor.

It is customary to use cylindrically-shaped catalyst pellets having a diameter essentially equal to the length thereof, such as diameters and lengths ranging from about 1/32" to about 3/8". It will be understood that the shape and dimensions of the pellets are not critical to the present invention and that pellets of any suitable shape and dimensions may be used as desired, by one wishing to practice the process of the present invention.

When cylindrical pellets of catalyst of the type described above are used, the weighted hourly space velocity may be varied within wide limits (e.g., 0.1 to 5 w/hr/w) in order to obtain a desired rate of conversion, as explained above. Normally, space velocities of about 0.5 to 2 w/hr/w will be employed.

Catalyst life is an important factor in conducting a continuous reaction. For example, if a catalyst is easily poisoned, or if catalyst pellets do not have good structural properties, the economics of the process will be seriously and adversely affected.

The catalysts of the present invention are not particularly susceptible to poisoning so this normally does not present a problem. However, under the reaction conditions employed, amines of the type used and formed herein have the potential capability of leaching or otherwise adversely affecting the structural integrity of the pellets. In an extreme instance, catalyst pellets having good initial crush strength and surface hardness will be reduced to fines very rapidly when used under reaction conditions such as those employed herein.

It is a feature of the present invention that the pelleted catalyst compositions have improved resistance to physical degradation when used to catalyze the reaction of monoethanolamine with ethylenediamine.

As a consequence, the catalyst compositions of the present invention are advantageously used for a continuous process for the continuous production of essentially linear polyethylenepolyamine reaction products from monoethanolamine and ethylenediamine. As shown herein, such catalyst compositions can be used for prolonged periods without the need for regeneration. Thus, in Example IV it is shown that a representative catalyst of the present invention was used for over 2,000 hours with good result. Nevertheless, with the passage of time deactivation will tend to slowly occur. Deactivation can be measured qualitatively as the increase of temperature required to maintain an essentially constant conversion rate for the monoethanolamine and ethylenediamine.

When a catalyst composition of the present invention has become deactivated, or at least partially deactivated, in the sense that the temperature required to maintain a desired conversion level is considered to be excessive, the catalyst may be regenerated with ease with oxygen under controlled regeneration conditions.

The minimum regeneration temperature is the temperature required, for the catalyst employed, both to burn impurities from the catalyst and to again thermally activate the catalyst. This can be determined experimentally (see Example IV-B) and is normally in excess of 400° C. (e.g., 450° C.). The maximum regeneration temperature is the temperature at which the catalyst employed is thermally deactivated. The better practice is to use a temperature well below the deactivation temperature range of about 700° C. to 900° C. (e.g., 550° C.).

Pure oxygen can be used, but it is preferably used in a concentration of about 1 to 20%, the balance being an inert gas (e.g. nitrogen, flue gas, etc). The catalyst bed is preferably preconditioned with a lean regeneration gas (e.g., 1–3% oxygen) for about 0.5 to 5 hours (e.g., 1–2 hours). Thereafter the oxygen concentration in the regeneration gas can be progressively increased or increased in stages to a concentration of from about 3% to about 20% oxygen while adjusting the temperature, if desired, to a temperature within the range of about 450° to 550° C. The oxygen treatment may be continued in this fashion suitably for about 2 to 10 hours. A preferred sequence to follow in practicing the regeneration process of the present invention is to: (a) pass an inert gas such as nitrogen through the bed while heating the same in order to purge the reaction bed of unreacted feedstock and reaction products; (b) contact the catalyst bed with a lean regeneration gas containing from about 1 to 3 mole percent of oxygen for about 1 to 2 hours at a temperature of about 450° to about 450° C.; (c) contact the catalyst bed with a mixture of air and inert gas containing about 4 to about 20 mol percent of oxygen for about 2 to 10 hours at a temperature of about 450° to about 550° C.; and (d) contact the catalyst bed with air for about 2 to 3 hours at 450° to about 550° C. Thereafter the catalyst bed is flushed with an inert gas until it is cooled and it may then be restored to service.

The catalyst compositions of the present invention are prepared by depositing a phosphorus compound on a support comprising an oxide of a group IVb transition metal oxide. The group IVb transition metal oxides include the oxides of titanium, zirconium, hafnium and thorium. Pellets of the group IVb metal oxide may be prepared by extrusion or by compaction in conventional pelleting apparatus using a pelleting aid such as graphite. It is also within the scope of the present invention to deposit the phosphorus compound on a powdered IVb metal oxide followed by pelleting and calcination.

Any appropriate liquid or liquefiable phosphorus compound can be used as a source of the phosphorus. For convenience, phosphoric acid will normally be used. However, other phosphorus compounds such as phosphoryl chloride ($POCl_3$), phosphorous acid, polyphosphoric acid, phosphorus halides, such as phosphorus bromide, alkyl phosphates and alkyl phosphites such as trimethyl phosphate, triethyl phosphate, trimethyl phosphite, triethyl phosphite, etc. may be utilized.

Preferably the catalyst composition is prepared by impregnating a preformed pellet. A suitable procedure to be used is to heat a liquid containing the liquid or liquefiable phosphorous compound at a temperature of about 100° to about 150° C. and to then add pellets in an amount about equal to the volume of the heated liquid. This treatment should be continued from about 0.5 to about 5 hours. At the end of that time, the resulting mixture of pellets and liquid is cooled, decanted to remove excess liquid followed by washing with an amount of water adequate to substantially completely remove unadsorbed liquid. Temperatures above 150° C. can be used, if desired, but there is no particular advantage in doing so.

It will be understood that the phosphorous that is present on a thus-treated pellet is not present as elemental phosphorous, but rather as phosphorous that is chemically bound, probably as an oxide, to the group IVb metal oxide support. This is demonstrated by the fact that repeated washing will not remove all of the phosphorous. However, the exact nature of the bonding is not completely understood.

The amount of phosphorous that is bonded or otherwise adheres to the support is a function of heating and other conditions used in the treating step and is also a function of the chemical identity of the phosphorous compound that is used as a source of phosphorous. Thus, from about 0.5 to about 10 wt. % of phosphorous is thermally bonded to at least the surface of the support. Under the treating conditions exemplified above, at least about 2.5 wt. % of phosphorous is caused to bond or otherwise permanently adhere to the pellets. There is an upper limit to the amount of phosphorous that bonds or otherwise permanently adheres to the support. This upper limit is, as indicated, a function of both the treating conditions and the chemical used as a source of the phosphorous. Normally, the maximum amount of phosphorous that can be caused to bond or otherwise permanently adhere to the pellets is within the range of about 5 to 10 wt. %.

As a matter of convenience, the normal practice is to use only one chemical as a phosphorous source (e.g., phosphoric acid). However, mixtures of two or more such reagents may be used, if desired.

Calcining is not mandatory if the pellets are impregnated at least at about 100° C., but the pellets can be calcined, if desired. Calcining is conducted for 2 to 24 hours at a temperature of 100° C. but below the temperature at which thermal destruction of the phosphorous bonding occurs. This can be determined experimentally for a particular catalyst (e.g., Example IV-B). Temperatures above 900° C. should be avoided. A suitable calcining temperature range is normally 200° to 800° C. and, more preferably, 500° to 700° C.

Other procedures can be used in adding phosphorous to the group IVb metal oxide. For example, the pellets can be treated with the phosphorous compound at ambient temperatures or at more modest elevated temperatures of less than about 100° C. In this situation, however, it is necessary to thermally activate the treated pellets by calcining under the conditions recited above.

Alternatively, the group IVb metal oxide can be treated with the phosphorous-containing compound in powdered form and the powder can thereafter be pelleted. If the treatment is conducted at a temperature of about 100° C. or more, thermal activation will normally have been obtained and it will not be absolutely necessary to perform a calcining operation. If lower treating temperatures are used, calcining is normally a desired operation. The calcining operation can be conducted prior to or subsequent to the pelleting step. Any appropriate pelleting procedure of the type known to those skilled in the art may be used. For example, the treated powdered group IVb metal oxide can be mixed with graphite and/or other binders and compacted or extruded under conventional conditions.

There are many compounds which can be formed from the reaction of ethylenediamine and monoethanolamine besides the preferred linear polyethylenepolyamines such as diethylenetriamine, triethylenetetramine, tetraethylenepentamine and pentaethylenehexamine. Less desirable cyclics and other compounds, such as piperazine, N-(2-aminoethyl)ethanolamine and N-(2-aminoethyl)piperazine, are also formed. The more desired linear polyethylenepolyamines can be easily recovered from the reaction product mixture by conventional methods such as distillation. Such distillation recovery methods are well known in the art. An outstanding advantage of the claimed invention is that the lower molecular weight polyethylenepolyamines recovered from the reaction mixture can be further reacted with monoethanolamine to produce a larger percentage of the higher molecular weight linear polyethylenepolyamines.

The following examples will further illustrate the preparation of predominantly linear polyethylenepolyamines from ethylenediamine and monoethanolamine by the use of the catalyst compositions of the present invention. They are given by way of illustration and not as limitations on the scope of the invention. Thus, it will be understood that reactants, proportions of reactants, and time, temperature and pressure of the reaction steps may be varied with much the same results achieved.

For purposes of convenience and brevity, the reactant compounds employed and the products obtained have been abbreviated in the following examples and tables. The abbreviations employed for these various compounds are:

EDA—ethylenediamine
MEA—monoethanolamine
PIP—piperazine
DETA—diethylenetriamine
TETA—triethylenetetramine
TEPA—tetraethylenepentamine
AEEA—N-(2-aminoethyl)ethanolamine
AEP—N-(2-aminoethyl)piperazine
HEP—N-(hydroxyethyl)piperazine

EXAMPLE I

1. Titania Catalyst Preparation

A series of pelleted catalysts were prepared by depositing phosphorous on a titania support.

A. PHOSPHORIC ACID

Titania supported phosphoric acid catalysts were prepared by heating about 100 cc of phosphoric acid to about 130° C. under an inert atmosphere in a flask fitted with a condenser. 105 cc of titania pellets were slowly added through the condenser and the temperature was maintained for the desired period of time.

Thereafter the catalyst was recovered by first decanting the excess phosphoric acid followed by the addition to the pellets of a large quantity of water. The pellets and water were slowly stirred to dissipate heat. The pellets were washed several times with copious amounts of water and dried.

B. PHOSPHORYL CHLORIDE ON TITANIA

When using phosphoryl chloride as the source of phosphorus, a slight modification of the above identified procedures was necessary. The phosphoryl chloride was refluxed at 105° C. The heat was turned off and the reflux was maintained by the addition of titania pellets at a rate sufficient to maintain a strong reflux. Thereafter, heat was used to maintain the temperature.

When the resulting reaction mixture was treated with water the phosphoryl chloride was hydrolysed. Constant stirring was very important in order to maintain good heat dissipation. Phosphorus bromide was also used as a source of phosphorus using the procedure outlined above for phosphoryl chloride.

For convenience, the catalysts prepared and a brief description of the same is set forth herein as Table I.

TABLE I

TITANIA CALALYST COMPOSITIONS

| Type | Number | Composition |
|---|---|---|
| A | 5464-72 | 40 wt. % Phosphate on alumina |
| A | 5494-4 | Titania (TiO$_2$) |
| A | 5494-16 | Titania treated with phosphoric acid (H$_3$PO$_4$) for ½ hour |
| A | 5494-5 | Titania treated with phosphoric acid for 2 hours |
| A | 5494-17 | Titania treated with phosphoric acid for 12 hours |
| A | 5494-95 | Titania treated with phosphoric acid for 2 hours |
| A | 5494-96 | Titania treated with phosphoric acid for 4 hours |
| B | 5494-6 | Titania treated with phosphoric acid for 2 hours and then calcined at 600° C. for 16 hours |
| B | 5494-65 | Titania treated with phosphoric acid, pelleted and then calcined at 600° C. for 16 hours |
| C | 5494-11 | Titania treated with phosphoric acid, aluminum nitrate (Al(NO$_3$)$_3$) then calcined at 600° C. for 16 hours |
| C | 5494-76 | Titania treated with phosphoric acid, aluminum nitrate and then calcined at 600° C. for 16 hours |
| C | 5494-77 | Titania treated with phosphoric acid, aluminum nitrate and then calcined at 600° C. for 16 hours |
| D | 5494-13 | Titania treated with phosphoryl chloride (POCl$_3$) for 4 hours |
| D | 5494-23 | Titania treated with phosphoryl chloride for 4 hours and then calcined at 600° C. for 16 hours |
| D | 5494-31 | Titania calcined at 600° C., then treated with phosphoryl chloride and recalcined at 600° C. for 16 hours |
| E | 5494-19 | Titania treated with phosphorous acid (H$_3$PO$_3$) for 2 hours |
| E | 5494-78 | Titania treated with phosphorous acid for 2 hours and then calcined at 600° C. for 16 hours |
| F | 5494-18 | Titania treated with polyphosphoric acid (PPA) for 2 hours |
| F | 5494-87 | Titania treated with polyphosphoric acid for 2 hours and then calcined at 600° C. for 16 hours |
| G | 5494-20 | Titania treated with phosphorous bromide (PBr$_3$) for 2 hours |

Preparation of Polyethylenepolyamines from Ethylenediamine and Monoethanolamine Using Titania Supported Phosphorus Catalysts.

The catalysts described in Table I were utilized for the conversion of ethylenediamine and monoethanolamine to a polyethylenepolyamine reaction product in a 100 cc continuous reactor system. Pellets were placed in the reactor and the feedstock that was fed to the reactor was a mixture of ethylenediamine and monoethanolamine in a molar ratio of about two moles of ethylenediamine per mole of monoethanolamine.

In order to obtain a basis for comparison, the reaction temperature was varied so as to obtain about 65% conversion of the monoethanolamine feedstock.

The reaction product was periodically sampled and analyzed by gas chromatographic analysis of the crude reactor effluent. Results were calculated on a feed-free basis.

rus bromide was the source of phosphorus). Diethylenetriamine yields of from about 50 to about 70% were obtained with this group of catalysts. Uniformly good yields of triethylenetetramine were also obtained.

TABLE II

TITANIA SUPPORTED PHOSPHOROUS CATALYSTS

| Catalyst | Phosphorous on Cat. (wt. %) | Temp., 0° C. @ 65% MEA Conv. | Selectivity PIP | DETA | AEEA | AEP & HEP | TETA | TEPA | Ratio: DETA PIP | TETA % N.C. | Pellet Strength | Cat. Type |
|---|---|---|---|---|---|---|---|---|---|---|---|---|
| 5464-72 |  | 333 | 6.7 | 38.5 | 2.6 | 4.5 | 18.3 | 5.9 | 7.7 | 77 |  |  |
| 5494-4 | — | — | — | — | — | — | — | — | — | — |  |  |
| 5494-16 | 2.2 | 331 | 2.6 | 61.8 | 0.5 | 1.6 | 18.0 | ~3 | 23.5 | 96 | 14 | A |
| 5494-5 | 1.9/2.2 | 328 | 2.7 | 59.2 | 0.6 | 2.3 | 19.5 | 4.5 | 23.5 | ~95 | 16 | A |
| 5494-17 | 1.6/2.2 | 306 | 2.2 | 52.9 | 0.6 | 1.8 | 18.5 | 3.4 | ~24 | 97 | 10 | A |
| 5494-95 |  | 331 | 2.5 | 49.2 | ~0.5 | 2.3 | 17.8 | 2.8 |  | 94 |  | A |
| 5494-96 |  | 333 | 2.5 | 57.3 |  | 1.9 | 15.8 | ~1 | ~25 | 97 |  | A |
| 5494-6 | 2.1 | 325 | 2.8 | 59.0 | 0.7 | 2.1 | 19.6 | 4.2 | 19.7 | 96 | 5 | B |
| 5494-65 |  | 301 | 3.8 | 64.4 | 0.5 | 3.7 | ~20.5 | 2.5 | 17.0 | 92 |  | B |
| 5494-11 | 1.3 | 340 | 3.2 | 56.1 | 0.5 | 2.3 | 18.9 | 4.0 | 17.4 | 95 | 6.7 | C |
| 5494-76 | 2.1 | ~337 | ~2.6 | ~54.6 | ~1.1 | — | 18.8 | ~2 |  | 97 | 9.7 | C |
| 5494-77 | 2.1 | 331 | 2.8 | 53.6 | 0.6 | 2.5 | 17.8 | 1.8 | 17.0 | 97 |  | C |
| 5494-13 | 5.3 | 311 | 2.4 | 65.9 | 0.3 | 2.1 | 19.0 | >2.5 | 25.2 | 95 | 12.7 | D |
| 5494-23 | 6.5 | 314 | 2.3 | 66.3 | 0.4 | 1.8 | 19.6 | 3.5 | 27.2 | 96 | 18 | D |
| 5494-31 |  | 323 | 2.4 | 59.2 | 1.2 | 1.7 | 18.2 | 3.0 | 29.7 | 97 | 9.7 | D |
| 5494-19 | 3.8 | 311 | 2.3 | 70.0 | 0.3 | 1.6 | 17.7 | 2.3 | 29.5 | 97 | 9.3 | E |
| 5494-78 | 5.2 | 328 | 2.3 | 69.8 | 0.3 | 2.3 | 19.6 | 3.4 |  | 97 | 7.3 | E |
| 5494-18 | 2.4 | 309 | 2.5 | 64.0 | 0.5 | 1.8 | 16.8 | ~3 | 25.5 | 96 | 11.6 | F |
| 5494-87 | 2.3 | 334 | ~3 | ~73 | 0.8 | ~3 | ~20 |  |  | ~98 | 5.0 | F |
| 5494-20 |  | 325 | 5.0 | 54.4 |  | 5.9 | 18.7 | 4.7 | 10.3 | 83 |  | G |

The catalysts tested and the results obtained in the series of tests are set forth in Table II. In general, each feedstock was run for at least 2½ hours to make sure that reaction conditions had stabilized.

Referring now to Table II it will be seen that the reference catalyst composition (5464-72) which comprised a commercially available 40 wt. % phosphate on alumina catalyst of the type disclosed in Brennan U.S. Pat. No. 4,103,087 at column 8, lines 50–54 gave results which were improved upon in all instances. This run shows that with a pelleted aluminum phosphate catalyst, and in a continuous reaction, the results obtained are not so favorable as those reported for batch reactions in the copending application application Ser. No. 283,713.

In particular, note that only about 77% of the triethylenetetramine fraction was noncyclic with this run. In contrast, with the catalyst of the present invention the noncyclic content was normally in excess of 90%. Note also that there was also a significantly smaller yield of diethylenetriamine with the reference catalyst.

The second reference catalyst (5494-4) was untreated titania pellets and it is seen that they were essentially inert insofar as conversion of monoethanolamine and ethylenediamine is concerned.

The type A titania supported catalysts wherein the source of phosphorus was phosphoric acid gave uniformly good results. Essentially equivalent results were obtained with the type B catalyst, however, the pellets were not quite so strong. The same comment applies to type C catalysts wherein the support was treated with phosphoric acid and thereafter there was an additional treatment with aluminum nitrate. The best pellet strength was obtained with the type D catalyst based on phosphoryl chloride.

Thus, Table II demonstrates that with titania supported pelleted catalyst in a continuous reaction system, it is possible to obtain excellent results in the reaction of monoethanolamine with ethylenediamine. The percentage of noncyclic reaction products is very high, being over 90% in all cases except for type G (when phospho-

ANALYSIS OF CATALYST PELLETS

In an attempt to obtain a better understanding of the catalytic phenomena involved, three of the catalyst compositions of Table II were subjected to a detailed analysis utilizing a scanning electron microscope (SEM).

The results of the first series of analyses is given in Table III attached. Note that with catalyst 5494-6, the phosphorus was concentrated in the initial 50 microns of the pellet surface.

In addition, the exterior surface at the end of the pellet was also analyzed and the results of this analysis are set forth in Table IV.

In respect of catalyst 5494-11, wherein the titania was treated with aluminum nitrate and phosphoric acid and then calcined, an analysis of the interior of the surface is given in Table V.

The scanning electron microscope analysis of the surface of catalyst 5494-11 is given in Table VI.

TABLE III

Analysis of $H_3PO_4/TiO_2$/Calcined (5494-6)
Interior Surface of Fractured Pellet Weight % of Detected Elements

| Element | Outer Edge | 39μ in. | 50μ in. | 100μ in. | Center | 50μ in From Opposite Side | 10μ in From Opposite Side |
|---|---|---|---|---|---|---|---|
| Na | 2.4 | 0.7 | 0 | 0 | 0 | 0 | 1.5 |
| Al | 2.7 | 1.9 | 0 | 0 | 0 | 0 | 0 |
| Si | 3.4 | 1.5 | 0 | 0 | 0 | 0 | 0 |
| P | 35.3 | 10.8 | tr | tr | 0.2 | 0 | 20.4 |
| Cl | 5.3 | 2.1 | 0 | 0 | 0 | 0 | 0 |
| K | 7.3 | 2.0 | 0 | 0 | 0 | 0 | 0 |
| Ca | 1.9 | 1.6 | 1.5 | 0.9 | 2.0 | 2.0 | 0.5 |
| Ti | 41.7 | 79.3 | 98.5 | 99.1 | 97.8 | 98.0 | 77.6 |
|  | 100.0 | 99.9 | 100.0 | 100.0 | 100.0 | 100.0 | 100.0 |

Above data indicate that the phosphorus is concentrated at the surface of the catalyst pellet in a layer less than 50 microns thick.

TABLE IV

Analysis of H₃PO₄/TiO₂/Calcined
(5494-6), Continued
Exterior Surface (End) of Pellet

| Element | Concentration, Weight % of Detected Elements | | | | | | |
|---|---|---|---|---|---|---|---|
| | 1 | 2 | 3 | 4 | 5 | 6 | 7 |
| Na | 1.1 | 0.8 | 0.9 | 0.6 | 1.0 | 1.1 | 0.8 |
| Al | 0.1 | 0.2 | 0.7 | 0.1 | 3.2 | 3.3 | 0.2 |
| Si | 1.4 | 1.2 | 1.6 | 1.1 | 2.8 | 3.0 | 1.7 |
| S | 0 | 0 | 0 | 0 | 0 | 0 | 1.2 |
| Cl | 0 | 0 | 0 | 0 | 0 | 0 | 0.8 |
| K | 0 | 0 | 0 | 0 | 0 | 0 | 1.2 |
| Ca | 0 | 1.0 | 0.5 | 0.5 | 3.7 | 3.1 | 0.8 |
| Ti | 66.3 | 68.6 | 67.1 | 72.1 | 61.3 | 60.5 | 62.0 |
| P | 31.0 | 28.2 | 29.3 | 25.5 | 27.9 | 29.0 | 31.3 |
| | 99.9 | 100.0 | 100.1 | 99.9 | 99.9 | 99.9 | 100.0 |

Above data indicate that the phosphorus concentration is relatively constant across the exterior surface of the pellet.

TABLE V

Analysis of H₃PO₄/TiO₂/Al(NO₃)/Calcined
Sample No. 4 (5494-11)
Interior Surface (Fractured) of Pellet

| Element | Concentrations, Wt % of Detected Elements | | |
|---|---|---|---|
| | 1 | 2 | 3 |
| Al | 2.5 | 0.88 | 1.5 |
| P | 1.7 | 0 | 0 |
| Ca | 1.2 | 0.82 | 1.5 |
| Ti | 94.6 | 98.3 | 97.0 |
| | 100.0 | 100.0 | 100.0 |

Edge of fractured pellet was very rough, so that the closest analysis to the edge was 7 microns away. At this location, the "P" concentration was very low. Comparing this with data in Table VI, it is evident that the phosphorus exists within a very thin surface layer, much thinner than that for H₃PO₄/TiO₂/calcined, and that the "P" concentrations are lower than those for the H₃PO₄/TiO₄/calcined catalysts.

TABLE VI

Analysis of H₃PO₄/TiO₂/Al(NO₃)₃/Calcined
Sample No. 4 (5494-11), Continued
Exterior Surface (End Face) of Pellet

| Element | Concentration, Weight % of Detected Elements | | | | | | |
|---|---|---|---|---|---|---|---|
| | 1* | 2 | 3 | 4 | 5 | 6 | 7 |
| Na | 0 | 0 | 0 | 0 | 0.4 | 0.3 | 0.1 |
| Al | 0 | 1.0 | 1.2 | 1.9 | 1.5 | 1.2 | 1.1 |
| Si | 0 | 0.4 | 0.4 | 0 | 0 | 0 | 0 |
| P | 5.3 | 12.5 | 10.8 | 12.5 | 15.8 | 10.0 | 12.9 |
| Ca | 0 | 0.5 | 0.6 | 1.0 | 0.8 | 0.2 | 0.7 |
| Ti | 94.7 | 85.6 | 87.0 | 84.7 | 81.6 | 88.3 | 85.3 |
| | 100.0 | 100.0 | 100.0 | 100.1 | 100.1 | 100.0 | 100.1 |

*Values suspect
The above data indicate that "P" concentrations are relatively constant across the end surface of the pellet. No reason can be offered for the low value on analysis #1. All "P" concentrations are lower than those for the H₃PO₄/TiO₂/calcined catalysts.

In the case of the preceding analysis, it was demonstrated that the phosphorus was concentrated near the surface of the pellet. When catalyst 5494-13 was analyzed used the scanning electron microscope, different reslts were obtained, as is shown by Table VII.

TABLE VII

Analysis of POCl₃/TiO₂
Sample No. 5 (5494-13)
Interior (Fracture) Surface of Pellet

| Element | Concentration, Wt % of Detected Elements | | | | |
|---|---|---|---|---|---|
| | 1 | 2 | 3 | 4 | 5 |
| Si | 0.3 | 1.5 | 0.6 | 1.0 | 0.7 |
| P | 6.8 | 8.2 | 7.2 | 8.7 | 8.5 |
| Cl | 0.6 | 0.8 | 1.1 | 1.2 | 1.2 |
| K | 0.1 | 0 | 0 | 0 | |
| Ca | 0.9 | 0.6 | 0.4 | 0.6 | 0.5 |

TABLE VII-continued

Analysis of POCl₃/TiO₂
Sample No. 5 (5494-13)
Interior (Fracture) Surface of Pellet

| Element | Concentration, Wt % of Detected Elements | | | | |
|---|---|---|---|---|---|
| | 1 | 2 | 3 | 4 | 5 |
| Ti | 91.4 | 89.0 | 90.7 | 88.5 | 89.2 |
| | 100.1 | 100.1 | 100.0 | 100.0 | 100.1 |

The above data indicate that the "P" concentration is approximately constant throughout the bulk of the catalyst particle, rather than being limited to a thin layer at the surface as in H₃PO₄/TiO₂/calcined and H₃PO₄/TiO₂/Al(NO₃)₃/calcined.

Further, when the exterior surface was analyzed, as set forth in Table VIII, it was found that the phosphorus was concentrated more in the interior of the catalyst than on the exterior. This demonstrates the need for caution when extrapolating from one catalyst composition to another in reactions of this nature.

TABLE VIII

Analysis of POCl₃/TiO₂
Sample No. 5 (5494-13) Continued
Exterior Surface (End) of Pellet

| Element | Concentration, Wt % of Detected Elements | | | | |
|---|---|---|---|---|---|
| | 1 | 2 | 3 | 4 | 5 |
| Si | 0.1 | 0.4 | 0.3 | 0.6 | 0.5 |
| P | 3.7 | 6.3 | 4.5 | 6.1 | 6.6 |
| Cl | 1.8 | 1.1 | 24.7* | 0.7 | 1.1 |
| Ca | 0.8 | 0.8 | 0.4 | 0.7 | 0.6 |
| Ti | 93.7 | 91.5 | 70.1 | 91.9 | 91.2 |
| | 100.1 | 100.1 | 100.0 | 100.0 | 100.0 |

*Value suspect
The above data indicate that "P" is distributed rather evenly across the exterior surface of the catalyst pellet, but is lower in concentration on the surface than inside the pellet. It is interesting that the lowest "P" concentration above corresponds to the lowest concentration within the pellet.

The catalyst compositions were also analyzed by X-ray defraction in bulk and after being powdered.

The results of the X-ray examination indicated that the titania than was used was in a single phase, namely as anatase. Phosphating of the titania with phosphoric acid produced the well known compound Ti(HPO₄)₂·2-H₂O. In addition, an unknown Ti-PO₄ compound was also detected. The X-ray defraction pattern was quite similar to that of three known triphosphates, namely AgTi₂(PO₄)₃, BaFeTi(PO₄)₃ and GeNb(PO₄)₃. Accordingly, the unknown was identified as a triphosphate possibly formed by the following reaction:

$$2TiO_2 + 2Ti(HPO_4)_3 \rightarrow 2HTi_2(PO_4)_3 + 2H_2O$$

Indexing of the unknown's pattern is given in Table IX, which follows:

TABLE IX

Indexing of Ti, PO₄ Unknown Pattern

| Intensity | d-Spacings, Å | | Miller Indices |
|---|---|---|---|
| | Obsd | Calculated[1] | |
| w | 6.05 | 6.11 | (012) |
| w | 4.35 | 4.41 | (014) |
| w | 4.20 | 4.23 | (110) |
| m | 3.68 | 3.68 | (006) |
| s | 3.50 | 3.48 | (202) TiO₂ also 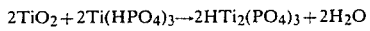 |
| m | 3.32 | 3.29 | (106) |
| w | 3.22 | 3.16 | (007) |
| w | 3.03 | 3.05 | (024) |
| m | 2.75 | 2.75 | (211) |
| m | 2.03 | 2.04 | (036) |
| w | 1.95 | 1.96 | (128) |
| w | 1.83 | 1.84 | (0·0·12) |
| w | 1.60 | 1.60 | (140) |
| w | 1.28 | 1.28 | (514) |

TABLE IX-continued

| | Indexing of Ti, PO4 Unknown Pattern | | |
|---|---|---|---|
| | d-Spacings, A | | Miller |
| Intensity | Obsd | Calculated[1] | Indices |
| w | 1.25 | 1.25 | (3 · 1 · 14) |

[1]Calculated using $1/d = 4/3(1/a^2)(h^2 + hk + k^2) + (1/c^2)l^2$, where hkl are Miller indices, a and c are lattice constants, 8.474 and 22.11A, respectively.

The X-ray defraction analysis studies further indicated that calcining converted essentially all of the $Ti(HPO_4)_2 \cdot H_2O$ to the new compound. The crystal size of the latter was determined to be about 125A. However, with respect to catalyst 5494-11 it was found that only a part of the $Ti(HPO_4)_2$ was converted to the new compound. The new compound was not detected in sample 5494-13.

The results obtained from the catalyst pellet analysis are extremely interesting in a number of respects. First, it is clearly demonstrated that new catalyst compositions were obtained in the case of the samples 5494-6 and 5494-11. Otherwise the new phosphorus compound would not have been found.

Further, the superior activity obtained with a titania support is not solely attributable to the presence of the new compound as shown by the results obtained in Table II.

Finally, the interaction between the phosphorus and the titania support will vary depending upon the chemical nature of the source of the phosphorus but, again as shown by Table II, uniformly good results are obtained when titania is used as a catalyst support for a phosphorus containing compound.

EXAMPLE II

Zirconia Supported Phosphorus Containing Catalyst Compositions given in Table X. The results obtained with this group of catalysts is set out in Table XI.

TABLE X

| | | Zirconia Catalyst Compositions |
|---|---|---|
| Type | Number | Composition |
| | 5464-72 | 40 wt % Phosphate on alumina |
| | 5484-37 | Zirconia |
| H | 5484-6 | Zirconia treated with 11 wt % phosphoric acid ($H_3PO_4$) for 1 hour at 125° C. |
| H | 5484-63 | Pelleted zirconia treated with phosphoric acid for 1 hour at 125° C. |
| H | 5484-17 | Zirconia treated with 22 wt % phosphoric acid for 1 hour at 125° C. |
| H | 5484-83 | Zirconia treated with 11 wt % phosphoric acid for 1 hour at 125° C. |
| H | 5484-84 | Zirconia treated with 11 wt % phosphoric acid for 2 hours at 125° C. |
| H | 5484-85 | Zirconia treated with 11 wt % phosphoric acid for 4 hours at 125° C. |
| H | 5494-71 | Zirconia treated with 11 wt % phosphoric acid for 24 hours at 125° C. |
| J | 5484-64 | No. 5484-63 calcined at 600° C. for 16 hours |
| J | 5484-29A | Zirconia treated with 10 wt % phosphoric acid for 1 hour at 125° C. and then calcined at 600° C. for 16 hours |
| J | 5484-56 | No. 5484-29A after 300 hours of reaction time |
| J | 5484-46 | Zirconia treated with 15 wt % of phosphoric acid and then calcined for 16 hours at 600° C. |
| J | 5484-47A | Zirconia treated with 11 wt % of phosphoric acid for 1 hour at 125° C. and then calcined at 600° C. for 16 hours |
| K | 5494-79 | Zirconia treated with phosphorous acid ($H_3PO_3$) for 2 hours |
| L | 5494-83 | No. 5494-79 calcined at 600° C. for 16 hours |
| M | 5494-29 | Zirconia treated with phosphoryl chloride for 4 hours |
| N | 5494-30 | No. 5494-29 calcined at 600° C. for 16 hours |
| O | 5494-86 | Zirconia treated with polyphosphoric acid (PPA) for 2 hours |
| P | 5494-88 | No. 5494-86 calcined at 600° C. for 16 hours |
| Q | 5494-81 | Zirconia treated with phosphorous bromide for 2 hours |

TABLE XI

| | Zirconia Supported Phosphorous Catalysts | | | | | | | | | | |
|---|---|---|---|---|---|---|---|---|---|---|---|
| | Phosphorous on Cat. | Temp, 0° C. @ 65% | Selectivity | | | | | | Ratio: DETA | TETA % | Pellet | Cat. |
| Catalyst | (wt. %) | MEA Conv. | PIP | DETA | AEEA | AEP & HEP | TETA | TEPA | PIP | N.C. | Strength | Type |
| 5464-72 | | 333 | 6.7 | 37.5 | 1.8 | 5.9 | 19.7 | 7.7 | 5.8 | 76 | | |
| 5484-37 | | — | — | — | — | — | — | — | — | | | |
| 5484-6 | | 316 | 3.9 | 54.2 | 0.9 | 1.5 | 17.1 | 2.4 | 15.7 | ~96 | | H |
| 5484-63 | | 318 | 3.5 | 56.4 | 1.3 | 2.1 | 15.8 | — | 15.3 | | | H |
| 5484-28 | | 322.5 | 3.7 | 56.2 | 1.1 | 2.2 | 16.8 | 2.2 | 15.4 | | | H |
| 5484-83 | | 322 | 5.1 | 50.8 | 0.7 | 3.7 | 15.5 | 3.0 | 10.5 | | | H |
| 5484-84 | | 320 | 4.4 | 54.0 | 0.4 | 2.5 | 15.2 | 3.1 | 12.5 | | | H |
| 5484-85 | | 322 | 4.8 | 55.6 | 0.9 | 2.2 | 12.4 | 2.4 | 12.3 | | | H |
| 5494-71 | | 319 | 3.4 | 71.3 | 1.0 | 2.0 | 19.5 | ~2 | 17.0 | 96 | 16.7 | H |
| 5484-64 | | 322 | 4.0 | 54.0 | — | 1.6 | 15.7 | ~2.5 | 13.0 | | | J |
| 5484-29A | | 323 | 3.7 | 51.2 | 1.1 | 2.2 | 17.3 | 2.7 | 13.8 | | | J |
| 5484-56 | | 323 | 4.5 | 52.5 | 0.2 | 3.2 | 16.8 | 3.5 | 12.2 | | | J |
| 5484-46 | | 325 | 3.7 | 53.2 | 0.7 | 1.8 | 15.2 | — | 14.8 | | | J |
| 5484-47A | | 324 | 3.7 | 54.5 | 1.2 | 2.2 | 15.1 | ~2 | 14.8 | | | J |
| 5494-79 | 6.5 | ~333 | ~8.5 | ~62 | ~0.4 | ~6.4 | ~19.0 | ~3.2 | — | | 13.7 | K |
| 5494-83 | | >330[(1)] | — | — | — | — | — | | | | | L |
| 5494-29 | 0.9 | 328 | 4.8 | 56.5 | 0.4 | 3.2 | 18.5 | 6.0 | 11.5 | 91 | 8.0 | M |
| 5494-30 | 1.4 | 331 | 4.0 | 57.5 | 0.3 | 3.6 | 22.5 | 5.0 | 14.5 | 93 | 13.3 | N |
| 5494-86 | 2.4 | 326 | 5.1 | 65.3 | 0.5 | 3.7 | 21.0 | 4.2 | 12.4 | 95 | 7.0 | O |
| 5494-88 | 2.6 | ~337 | ~6 | ~67 | ~0.2 | ~4.5 | ~19 | ~2.5 | — | ~92 | 12.7 | P |
| 5494-81 | 2.0 | 332 | 4.6 | 62.7 | 1.2 | 2.6 | 20.6 | ~3.7 | 11.7 | 96 | 6.0 | Q |

[(1)]The highest MEA conversion attained at this temperature was only about 24%

A series of phosphorus containing zirconia supported catalyst compositions were prepared using the procedure outlined above in Example I. The pelleted catalysts were tested in the 100 cc continuous reactor described in Example I using the same conversion conditions. The catalyst compositions that were prepared are With reference to Table XI, it will be seen that once again there was a good conversion of the monoethanolamine and ethylenediamine to noncyclic products characterized by good yields of diethylenetriamine and triethylenetetramine.

This series of tests demonstrates that the zirconia supported catalysts give results equivalent to those obtained with titania.

An attempt to analyze the zirconia supported catalysts using a scanning electron microscope were unsuccessful because the phosphorus content of the PK—emission line waive length, 6.1549A is very close to the ZrL—emission line, 6.0776A. These two lines could not be resolved using the electronic discriminator with which the scanning electron microscope was fitted.

Insofar as X-ray defraction analysis is concerned, it was determined that the zirconia was an equimix of monoclinic zirconia, baddeleyite and a tetragonal phase usually formed at higher temperatures.

Surface scrapings from the zirconia catalyst that had been treated with the phosphorous compound contained some rather large crystals of $ZrP_2O_7$. Because of their low surface area, it is doubtful that this $ZrP_2O_7$ is responsible for the excellent activity of the zirconia supported catalyst. The $ZrP_2O_7$ X-ray pattern is weak, indicating that $ZrP_2O_7$ represents a small fraction of the phosphorus present. It is probable that another phosphorous compound that is amorphous is the catalytically active species.

EXAMPLE III

Recycle Studies

The IVb metal oxide supports tend to shift product distribution towards diethylenetriamine. There are times when it is desirable to obtain greater yields of triethylenetetramine or tetraethylenepentamine. Accordingly, a series of recycle tests were run to determine the feasibility of recycle of diethylenetriamine. The reaction sequence described above for the 100 ml. reactor was used for the recycle studies. However, 20 wt. % of the ethylenediamine in the feed was replaced with diethylenetriamine in two runs and all of the monoethanolamine was replaced with diethylenetriamine in the other two runs.

The catalyst compositions that were used are identified in Table XII and the results of the simulated recycle tests are set out in Table XIII.

TABLE XII

| | Catalyst Compositions, Simulated Recycle | |
|---|---|---|
| Type | Number | Description |
| A | 5494-7 | Titania treated with phosphoric acid for 2 hours |
| A | 5494-8 | Titania treated with phosphoric acid for 2 hours |
| H | 5494-2 | Zirconia treated with phosphoric acid for 2 hours |
| H | 5494-3 | Zirconia treated with phosphoric acid for 2 hours |

TABLE XIII

| | Simulated Recycle of Diethylene Triamine | | | | | | | | |
|---|---|---|---|---|---|---|---|---|---|
| | | | | Selectivity | | | Ratio: | | |
| Catalyst | PIP | DETA | AEEA | AEP & HEP | TETA | TEPA | DETA PIP | TETA % NC | Feed Recycle |
| 5494-7 | 3.3 | 51.5 | 1.6 | 2.5 | 29.0 | 6.5 | 15.6 | 96 | 20% DETA |
| 5494-8 | 5.0 | 33 | 1.6 | 5.9 | 39.7 | 22.5 | 6.5 | ~94 | 100% DETA |
| 5494-2 | 5.9 | 32.5 | 0.9 | 5.0 | 21.0 | 7.8 | 5.8 | 88 | 20% DETA |
| 5494-3 | 7.5 | 39.5 | 0.5 | 8.0 | 37.5 | 15.2 | 5.3 | ~85 | 100% DETA |

As will be seen from Table XIII, with both titania and zirconia, the very high selectivity to noncyclic products was once again obtained. There was a significant increase in the yield of triethylenetetramine and also an improvement in the yield of tetraethylenepentamine.

EXAMPLE IV-A

This example is illustrative of the long term stability and activity of catalyst compositions of the present invention and of the low susceptibility of such catalyst compositions to poisoning.

A fresh batch of catalyst (5544-20) was prepared using the procedure of Example Ib to prepare a catalyst as set forth in Example I in respect to catalyst 5494-23.

Catalyst 5544-20 was used for a prolonged life study using the equipment and procedures of Example I. In this instance, however, more severe reaction temperature conditions were used in order to accelerate the effects of long term usage. For this purpose a monoethanolamine conversion of 80% was established and maintained throughout about 2000 hours of reaction time. At the end of that time the run was arbitrarily terminated. Representative results of the test are set forth in Table XIV-A.

TABLE XIV-A

| | 2000 Hour Catalyst Life Study - Titania Having Phosphorous Derived from Phosphoryl Chloride Deposited Tereon | | | | | | | | |
|---|---|---|---|---|---|---|---|---|---|
| Elapsed Time | Temp, °C. @ 80% MEA Conversion | | | Selectivity | | | | Ratio: DETA PIP | % NC in TETA |
| | | PIP | DETA | AEEA | AEP | TETA | TEPA | | |
| 125 | 315 | 2.6 | 48.0 | 0.2 | 2.7 | 17.9 | 2.5 | 18.8 | 93 |
| 715 | 325 | 2.5 | 54.6 | 0 | 2.3 | 19.4 | 4.4 | 21.8 | 95 |
| 925 | 330 | 2.7 | 55.3 | 0.1 | 2.5 | 20.7 | 5.0 | 20.7 | 92 |
| 1195 | 335 | 2.5 | 53.3 | 0.1 | 2.4 | 19.8 | 5.7 | 21.4 | 94 |
| 1340 | 340 | 2.8 | 51.6 | 0 | 2.7 | 21.1 | 5.7 | 18.8 | 91 |
| 1645 | 350 | 3.6 | 48.0 | 0.2 | 3.3 | 19.8 | 5.7 | 13.4 | 92 |
| 1815 | 350 | 3.8 | 48.3 | 0 | 3.4 | 20.6 | 5.8 | 12.9 | ~85 |
| 2012 | 355 | 3.4 | 52.2 | 0 | 3.1 | 20.9 | 5.6 | 15.3 | 93 |

As can be seen from Table XIV-A, the catalyst had good initial selectivity and the selectivity remained good throughout the run.

The temperature required to maintain MEA conversion at 80% increased from 315° C. to about 335° C. during the first 1000 hours of operating, indicating a slight loss in activity. The use of a temperature of 335°

C. at the end of the run indicates an overall moderate loss of activity.

EXAMPLE IV-B

Catalyst Regeneration

A titania-supported phosphate catalyst prepared in accordance with Example I was charged to a 100 cc continuous reactor and subjected to an accelerated aging test using, as a feed a mixture of ethylenediamine and monoethanolamine in a ratio of 2 mols of ethylenediamine per mol of monoethanolamine. The feed was charged at a liquid hourly at the rate of about 1 volume of liquid feed per hour per volume of catalyst. Pressure was held at 1500 lbs. and the temperature was adjusted to give about an 80% MEA conversion. At the beginning of the run at a temperature of about 325° C., analysis indicated a conversion of monoethanolamine of about 78%, a ratio of diethylenetriamine to piperazine of about 19 and a reaction product containing about 94% noncyclic compounds in the triethylenetetramine fraction. In a duplicate run at 325° C. the initial MEA conversion is found to be about 81% and the ratio of diethylenetriamine to piperazine was found to be about 17; the percent of noncyclic products in the triethylenetetramine fraction was found to be about 93%. In order to simulate a prolonged run, an accelerated aging procedure was used wherein the catalyst bed was held at reaction conditions without feed for a period of about 2 weeks. After the 2 week period, a temperature of about 345° C. was required to obtain about an 80% conversion of monoethanolamine. In a specific run, after two weeks of accelerated aging, MEA conversion was 83%, the ratio of DETA to PIP was 7 with only about 72% noncyclic products in the TETA fraction.

Thereafter, the catalyst was regenerated in accordance with the following procedure:

(1) The catalyst bed was heated to about 450° C.;

(2) A mixture of about 100 cc per minute of air in 700 cc per minute of nitrogen was passed through the catalyst bed for about 1 hour;

(3) Next a mixture of about 100 cc per minute of air and 300 cc per minute of nitrogen was passed over the catalyst bed for about 1 hour;

(4) Thereafter air was charged without inert gas at the rate of 100 cc per minute for 2 hours; and (5) The catalyst bed was flushed with nitrogen while cooling over night.

After regeneration the catalyst was again tested for activity and at a temperature of 325° C. the monoethanolamine conversion was about 77%; the ratio of diethylenetriamine to piperazine was about 19 and the percentage of noncyclic products in triethylenetetramine fraction was once again 94%. Thus, regeneration had been successfully performed.

When the preceding regeneration procedure was attempted at 350° C., regeneration was unsuccessful while at 400° C. the results were unsatisfactory.

An attempt to regenerate the catalyst by heating at 350° C. in a nitrogen stream was unsuccessful.

An attempt to regenerate the catalyst by washing at 250° C. with feed was also ineffective.

EXAMPLE V

This example is illustrative of the utility of hafnia as a support in the preparation and use of the catalyst compositions of the present invention.

The amount of hafnia available was insufficient to permit the preparation of the number of pellets required for a continuous evaluation using the equipment and reaction conditions of Example I. However, enough hafnia was available to permit a batch evaluation using powdered catalyst.

CATALYST PREPARATION

Typically, these catalysts were prepared by addition of 50 g of the metal oxide power to 150 cc of 85% $H_3PO_4$ at 130° C. This temperature was maintained for approximately five hours. The solids were then separated by filtration through a fritted glass funnel; filter paper systems were not adequate as the phosphoric acid caused disintegration of the paper and subsequent product loss. The product was then washed to remove excess phosphoric acid and dried.

GENERAL EXPERIMENTAL PROCEDURES

All batch reactions were carried out in a 300 cc stainless steel, rocking autoclave. They were used with glass linears to minimize the effects of catalyst derived impurities from the clave walls.

The general procedure consisted of placing 6.1 g (20 wt % basis MEA) of catalyst in a linear followed by addition of 60.5 g of a 1.1 EDA/MEA mixture (30 g EDA and 30.5 g MEA). The linear was placed in the reactor, the system was purged with nitrogen, and finally heated to 315° C. for 2 hours. The crude reaction product was filtered from the catalyst and analyzed by GC using an OV-17 chromatography column.

The supports used for this series of tests included titania, zirconia and hafnia. Powdered T1067 was also run to provide a basis for comparision.

The results are set forth in Table XV.

TABLE XV

| | Batch Run Evaluation of Titania, Zirconia and Hafnia as Catalyst Supports | | | | | |
|---|---|---|---|---|---|---|
| Catalyst | Conversion | | Selectivity | | | Ratio: DETA |
| Support | EDA | MEA | PIP | DETA | AEEA | PIP |
| Titania | 51 | 83 | | | | 6.5 |
| Zirconia | 3.5 | 5.2 | | | | 5.1 |
| Hafnia | 5.8 | 6.4 | 4.7 | 65.7 | 5.4 | 14.0 |
| T-1067 | 6.3 | 17.7 | 3.0 | 53.7 | 17.9 | 17.7 |

Batch tests such as those summarized in Table XV are characterized by poor reproducibiity. However, they do provide a qualitative measure of catalyst suitability.

It can be concluded from the results of Table XV that pelleted thermally activated catalyst compositions comprising hafnia having phosphorous derived from phosphoric acid deposited thereon will give results analogous to those obtained in Example I and Example II where titania and zirconia, respectively, were used as supports.

The foregoing examples of the present invention have been given by way of illustration only and are not intended as limitations on the scope of the invention which is defined by the following claims.

I claim:

1. In a method wherein monoethanolamine is continuously reacted with ethylenediamine in a reaction zone in the presence of a pelleted catalyst under conversion conditions including a temperature of from about 250° C. to about 400° C. and a pressure of from about 500 to about 3000 psig. to provide an essentially noncyclic reaction product comprising polyethylenepolyamines, wherein the catalyst comprises a group IVb metal oxide support having from about 0.5 to about 10 wt. % of phosphorous thermally chemically bonded to at least the surface thereof and wherein said pelleted catalyst becomes at least partially deactivated with the passage of time:

The improvement which comprises:
(a) regenerating said catalyst for further use in said continuous process at a catalyst activating temperature of from about 450° C. to about 700° C. with an oxygen-containing gas for a period of time within the range of about 2 to 12 hours sufficient to regenerate said catalyst; and
(b) thereafter again initiating the continuous reaction of monoethanolamine with ethylenediamine in said reaction zone in the presence of said thus regenerated catalyst under said conversion conditions to provide an essentially noncyclic product comprising polyethylenepolyamines.

2. A method as in claim 1 wherein said group IVb metal oxide support is titania.

3. A method as in claim 1 wherein said group IVb metal oxide support is zirconia.

4. In a continuous process for the manufacture of an essentially noncyclic reaction product comprising polyethylenepolyamines by continuously contacting monoethanolamine with ethylenediamine in a reaction zone in the presense of a pelleted catalyst comprising a group IVb metal oxide support having from about 0.5 to about 10 wt. % of phosphorous thermally, chemically bonded to at least the surface thereof under conversion conditions comprising a temperature within the range of about 250° to about 400° C., a pressure of about 500 to about 3000 psig and wherein the mol ratio of ethylenediamine to monoethanolamine is in the range of about 1 to about 5 mols of ethylenediamine per mol of monoethanolamine, whereby, with the passage of time, said catalyst becomes at least partially deactivated:

The improvement which comprises:
(a) passing an inert gas through said catalyst bed to purge said reaction bed of unreacted feedstock and reaction products;
(b) contacting said catalyst bed at a temperature of from about 450° C. to about 550° C. with a mixture of oxygen and an inert gas containing from about 1 to about 20 mol percent of oxygen for a period of time within the range of about 0.5 to about 10 hours; and
(c) thereafter again bringing monoethanolamine and ethylenediamine into contact with said catalyst under said reaction conditions to again provide an essentially noncyclic product comprising polyethylenepolyamines.

5. A method as in claim 4 wherein said group IVb metal oxide support is titania.

6. A method as in claim 4 wherein said group IVb metal oxide is zirconia.

7. A method as in claim 4 wherein the inert gas is nitrogen.

8. In a method wherein monoethanolamine is continuously catalytically reacted with ethylenediamine in a reaction zone under conversion conditions including a temperature of from about 250° C. to about 400° C. and a pressure of about 500 to about 3000 psig. in the mol ratio of about 1 to 5 mols of ethylenediamine per mol of monoethanolamine to thereby provide an essentially noncyclic reaction product comprising polyethyleneopolyamines and wherein the pelleted catalyst comprises a group IVb metal oxide support having from about 0.5 to about 10 wt. % of phosphorous thermally chemically bonded to at least the surface thereof, whereby with the passage of time said catalyst will become at least partially deactivated:

The improvement which comprises:
(a) discontinuing the passage of feedstock over said catalyst bed;
(b) passing a stream of nitrogen through said bed to purge said bed of unreacted feedstock and reaction products;
(c) next charging a lean regeneration gas composed of a mixture of air and nitrogen containing from about 1 to about 3 mol percent of oxygen over said catalyst for a period of time within the range of about 1 to 2 hours at a temperature of about 400° to about 450° C.;
(d) next charging a mixture of air and nitrogen containing about 4 to about 20 mol percent of oxygen over said catalyst bed for about 2 to 10 hours at a temperature of about 450° to 550° C.;
(e) next charging air over said catalyst bed at a temperature of about 450° to about 550° C. for about 2 to 3 hours; and
(f) again contacting said catalyst with a mixture of monoethanolamine and ethylenediamine in said reaction zone in the presence of said thus regenerated catalyst under said conversion conditions to again provide an essentially linear product comprising polyethyleneopolyamines.

9. In a method wherein monoethanolamine is continuously catalytically reacted with ethylenediamine in a reaction zone under conversion conditions including a temperature of from about 250° C. to about 400° C. and a pressure of about 500 to about 3000 psig. in the mol ratio of about 1 to 5 mols of ethylenediamine per mol of monoethanolamine to thereby provide an essentially noncyclic reaction product comprising polyethylenepolyamines and wherein the pelleted catalyst consists essentially of a group IVb metal oxide support having from about 0.5 to about 10 wt. % of phosphorous thermally chemically bonded to at least the surface thereof; whereby with the passage of time said catalyst will become at least partially deactivated:

The improvement which consists essentially of the steps of:
(a) discontinuing the passage of feedstock over said catalyst bed;
(b) passing a stream of nitrogen through said bed to purge said bed of unreacted feedstock and reaction products;
(c) next charging a lean regeneration gas composed of a mixture of air and inert gas containing from about 1 to about 3 mol percent of oxygen over said catalyst for a period of time within the range of about 1 to 2 hours at a temperature of about 400° to about 450° C.;
(d) next charging a mixture of air and inert gas containing about 4 to about 20 mol percent of oxygen over said catalyst bed for about 2 to 10 hours at a temperature of about 450° to 550° C.;
(e) next charging air over said catalyst bed at a temperature of about 450° to about 550° C. for about 2 to 3 hours;
(f) next flushing said catalyst bed with an inert gas; and
(g) again contacting said catalyst with a mixture of monoethanolamine and ethylenediamine in said reaction zone in the presence of said thus regenerated catalyst under said conversion conditions to again provide an essentially linear product comprising polyethylenepolyamines.

10. A method as in claim 9 wherein the group IVb metal oxide support is titania.

11. A method as in claim 9 wherein the group IVb metal oxide support is zirconia.

* * * * *